(12) United States Patent
Zhang et al.

(10) Patent No.: US 11,704,498 B2
(45) Date of Patent: Jul. 18, 2023

(54) METHOD AND APPARATUS FOR TRAINING MODELS IN MACHINE TRANSLATION, ELECTRONIC DEVICE AND STORAGE MEDIUM

(71) Applicant: Beijing Baidu Netcom Science and Technology Co., Ltd., Beijing (CN)

(72) Inventors: Ruiqing Zhang, Beijing (CN); Chuanqiang Zhang, Beijing (CN); Zhongjun He, Beijing (CN); Zhi Li, Beijing (CN); Hua Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 314 days.

(21) Appl. No.: 17/200,551

(22) Filed: Mar. 12, 2021

(65) Prior Publication Data
US 2021/0390266 A1    Dec. 16, 2021

(30) Foreign Application Priority Data

Jun. 16, 2020    (CN) .......................... 202010550591.5

(51) Int. Cl.
| | | |
|---|---|---|
| G06F 40/30 | (2020.01) | |
| G06F 40/51 | (2020.01) | |
| G06F 40/44 | (2020.01) | |
| G06F 40/49 | (2020.01) | |
| G06F 18/214 | (2023.01) | |

(52) U.S. Cl.
CPC ............ *G06F 40/30* (2020.01); *G06F 18/214* (2023.01); *G06F 40/44* (2020.01); *G06F 40/49* (2020.01); *G06F 40/51* (2020.01)

(58) Field of Classification Search
None
See application file for complete search history.

(56) References Cited

U.S. PATENT DOCUMENTS 10,185,713 B1 * 1/2019 Denkowski ............. G06F 40/51
11,151,334 B2 * 10/2021 Rezagholizadeh .... G06N 3/047
(Continued)

OTHER PUBLICATIONS

Mandy Guo et al. "Effective Parallel Corpus Mining using Bilingual Sentence Embeddings" arXiv:1807.11906v2 (Year: 2018).*
(Continued)

*Primary Examiner* — Richemond Dorvil
*Assistant Examiner* — Alexander G Marlow
(74) *Attorney, Agent, or Firm* — Kwan & Olynick LLP

(57) ABSTRACT

A method and apparatus for training models in machine translation, an electronic device and a storage medium are disclosed, which relates to the field of natural language processing technologies and the field of deep learning technologies. An implementation includes mining similar target sentences of a group of samples based on a parallel corpus using a machine translation model and a semantic similarity model, and creating a first training sample set; training the machine translation model with the first training sample set; mining a negative sample of each sample in the group of samples based on the parallel corpus using the machine translation model and the semantic similarity model, and creating a second training sample set; and training the semantic similarity model with the second training sample set.

9 Claims, 5 Drawing Sheets

(56) References Cited

U.S. PATENT DOCUMENTS

| | | |
|---|---|---|
| 2017/0060854 A1 | 3/2017 | Zeng et al. |
| 2019/0197118 A1 | 6/2019 | Zeng et al. |
| 2020/0081982 A1* | 3/2020 | Tu .................... G06N 3/047 |
| 2020/0210772 A1* | 7/2020 | Bojar ............. G06F 18/2148 |
| 2021/0157991 A1* | 5/2021 | Wang ................ G06N 3/047 |
| 2021/0182503 A1* | 6/2021 | Li ...................... G06F 40/51 |

OTHER PUBLICATIONS

Mikel Artetxe, Holger Schwenk "Margin-based Parallel Corpus Mining with Multilingual Sentence Embeddings" arXiv:1811.01136v2 (Year: 2019).*

Holger Schwenk "Filtering and Mining Parallel Data in a Joint Multilingual Space" arXiv:1805.09822v1 (Year: 2018).*

Jakob Uszkoreit, Jay Ponte, Ashok Popat, and Moshe Dubiner. 2010. Large Scale Parallel Document Mining for Machine Translation. In Proceedings of the 23rd International Conference on Computational Linguistics (Coling 2010), pp. 1101-1109, Beijing, China. Coling 2010 Organizing Committee. (Year: 2010).*

Jiwei Li et al. "Adversarial Learning for Neural Dialogue Generation" arXiv:1701.06547v5 (Year: 2017).*

Zhen Yang, Wei Chen, Feng Wang, Bo Xu "Improving Neural Machine Translation with Conditional Sequence Generative Adversarial Nets" arXiv:1703.04887v4 (Year: 2018).*

Lijun Wu, Yingce Xia, Fei Tian, Li Zhao, Tao Qin, Jianhuang Lai, Tie-Yan Liu "Adversarial Neural Machine Translation" Proceedings of Machine Learning Research 95:534-549 (Year: 2018).*

Extended European Search Report Issued in European Patent Application No. 21162113.1, dated Sep. 7, 2021, 8 Pages.

Mandy Guo et al., "Effective Parallel Corpus Mining using Bilingual Sentence Embeddings", Arxiv.org, Cornell University Library, Ithaca, NY, Jul. 31, 2018.

Guo, Mandy, et al., Effective Parallel Corpus Mining used Bilingual Sentence Embeddings, Google AI, Mountain View, CA and Carnegie Mellon University, Pittsburgh, PA. Dated Aug. 2, 2018, http://arxiv.org/pdf/1807.11906/pdf, 12 pages.

JPO Office Action issued for Application No. JP20200192793, 3 pages.

* cited by examiner

METHOD AND APPARATUS FOR TRAINING MODELS IN MACHINE TRANSLATION, ELECTRONIC DEVICE AND STORAGE MEDIUM

The present application claims the priority of Chinese Patent Application No. 202010550591.5, filed on Jun. 16, 2020, with the title of "Method and apparatus for training models in machine translation, electronic device and storage medium". The disclosure of the above application is incorporated herein by reference in its entirety.

FIELD OF THE DISCLOSURE

The present application relates to the field of computer technologies, and particularly to the field of natural language processing technologies and the field of deep learning technologies, and in particular, to a method and apparatus for training models in machine translation, an electronic device and a storage medium.

BACKGROUND OF THE DISCLOSURE

Machine translation is often involved in a natural language processing (NLP) process, and currently, sentences are mainly translated using a machine translation model pre-trained based on the deep learning technology. However, a source sentence may sometimes have different translation results with the same meaning. At this moment, for example, a semantic similarity model may be used to evaluate whether the translation results are similar.

The existing semantic similarity model in the field of machine translation may be trained with a parallel corpus. The parallel corpus includes a plurality of samples, each of which includes a sentence pair (x, y), x being the source sentence, y being a translated target sentence, and the source sentence and the target sentence being in different languages. The semantic similarity model may map the source and target languages to the same representation space. Specifically, each sentence pair (x, y) in the parallel corpus has a training target that the similarity sim(x, y) between (x, y) is greater than the similarity sim(x, y') between x and a target sentence y' corresponding to any other sample in a training sample group. From an objective function, (x, y) is called a positive sample, and (x, y') is called a negative sample. The objective function may be denoted as min(sim (x, y')-sim(x, y)), and the training target is to minimally converge the objective function.

However, the target sentences of some other samples in the training sample group have a quite similar meaning to y', for example, "one shot kill" and "no shot was wasted" may serve as translations of x "One shot, one kill", but the semantic similarity model has a compulsive requirement that the similarity between x and y is higher than the similarity between x and y', which is unreasonable. Based on this, the existing semantic similarity model has a poor accuracy of identifying the target sentences which are translated by the machine translation model and have the same meaning.

SUMMARY OF THE DISCLOSURE

In order to solve the above-mentioned problems, the present application provides a method and apparatus for training models in machine translation, an electronic device and a storage medium.

According to an aspect of the present application, there is provided a method for training models in machine translation, including:
mining similar target sentences of a group of samples based on a parallel corpus using a machine translation model and a semantic similarity model, and creating a first training sample set;
training the machine translation model with the first training sample set;
mining a negative sample of each sample in the group of samples based on the parallel corpus using the machine translation model and the semantic similarity model, and creating a second training sample set; and
training the semantic similarity model with the second sample training set.

According to another aspect of the present application, there is provided an electronic device, comprising:
at least one processor; and
a memory communicatively connected with the at least one processor;
wherein the memory stores instructions executable by the at least one processor, and the instructions are executed by the at least one processor to enable the at least one processor to perform a method for training models in machine translation, wherein the method comprises:
mining similar target sentences of a group of samples based on a parallel corpus using a machine translation model and a semantic similarity model, and create a first training sample set;
training the machine translation model with the first training sample set;
mining a negative sample of each sample in the group of samples based on the parallel corpus using the machine translation model and the semantic similarity model, and creating a second training sample set; and
training the semantic similarity model with the second sample training set.

According to still another aspect of the present application, there is provided a non-transitory computer readable storage medium with computer instructions stored thereon, wherein the computer instructions are used for causing a computer to perform a method for training models in machine translation, wherein the method comprises:
mining similar target sentences of a group of samples based on a parallel corpus using a machine translation model and a semantic similarity model, and creating a first training sample set;
training the machine translation model with the first training sample set;
mining a negative sample of each sample in the group of samples based on the parallel corpus using the machine translation model and the semantic similarity model, and creating a second training sample set; and
training the semantic similarity model with the second sample training set.

According to the technology of the present application, by training the two models jointly, while the semantic similarity model is trained, the machine translation model may be optimized and nurtures the semantic similarity model, thus further improving the accuracy of the semantic similarity model.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present application. In the drawings.

DETAILED DESCRIPTION OF PREFERRED EMBODIMENTS

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Figure 1:
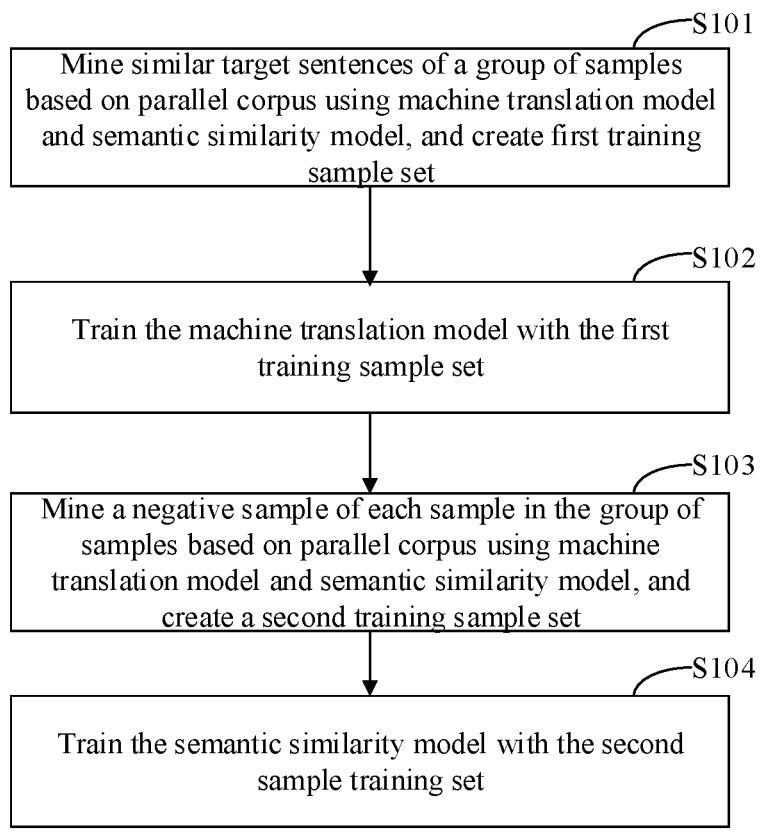
FIG. 1 is a schematic diagram according to a first embodiment of the present application.

FIG. 1 is a schematic diagram according to a first embodiment of the present application; as shown in FIG. 1, the present application provides a method for training models in machine translation, which may include the following steps:

S101: mining similar target sentences of a group of samples based on a parallel corpus using a machine translation model and a semantic similarity model, and creating a first training sample set.

An apparatus for training models in machine translation may serve as an execution subject of the method for training models in machine translation according to this embodiment, and may be configured as an independent electronic entity (for example, a hardware device, such as a computer), or an application integrated with software, and when in use, the application is run on a computer device to train the models in the field of machine translation.

S102: training the machine translation model with the first training sample set;

S103: mining a negative sample of each sample in the group of samples based on the parallel corpus using the machine translation model and the semantic similarity model, and creating a second training sample set; and S104: training the semantic similarity model with the second sample training set.

In this embodiment, two models, the machine translation model and the semantic similarity model, are involved in the model training process, and the method is also used to retrain these two models to perform a fine-tuning process, thereby improving the performance of the semantic similarity model, and accurately identifying the target sentences with the same meaning. That is, two target sentences with the same meaning may be given a higher score.

It should be noted that, before the training process in this embodiment, the machine translation model and the semantic similarity model in this embodiment are also trained independently based on the deep learning technology. For example, the machine translation model may be trained with the parallel corpus to learn translation knowledge for each sample in the parallel corpus. The semantic similarity model is also trained according to relevant knowledge of the background of the disclosure. However, the machine translation model and the semantic similarity model are trained independently in the prior art. Therefore, the semantic similarity model is unable to accurately identify the target sentences which have the same meaning after translation, and the target sentences with the same meaning are unable to be all used as the translated target sentences. Based on this, in the training method according to this embodiment, on the basis of the above-mentioned technology, with the technical solution of this embodiment, the machine translation model and the semantic similarity model which are pre-trained respectively are trained jointly, such that the semantic similarity model may accurately identify the target sentences with the same meaning, and thus, by referring to the judgment of the semantic similarity model, the translation results of the machine translation model may be enriched, and the target sentences with the same meaning may be increased.

Specifically, the training process of the models in this embodiment may include: training the machine translation model and training the semantic similarity model; in this embodiment, the joint training process is implemented, such that when the machine translation model is trained, parameters of the semantic similarity model may be considered to be fixed and do not participate in adjustment in the training process. Similarly, when the semantic similarity model is trained, parameters of the machine translation model may be considered to be fixed and do not participate in adjustment in the training process.

In order to have a targeted training of the models, before each training step, a corresponding training data set is created, and for example, the first training sample set is created to train the machine translation model. In this embodiment, the purpose is to enable the machine translation model to learn different translation results with the same meaning of the samples, and therefore, when the first training sample set is created in this embodiment, the similar target sentences of the group of samples may be mined based on the parallel corpus using the machine translation model and the semantic similarity model, and the first training sample set may be created. That is, the first training sample set includes one group of samples and the similar target sentence corresponding to the source sentence of each sample in the group of samples. When trained with the first training sample set, the machine translation model may learn to translate the source sentence in the sample into the target sentence, and meanwhile learn the capacity of translating the source sentence in the sample into the similar target sentence.

Immediately after the machine translation model is trained, the semantic similarity model is trained, and the second training sample set is required to be created before the semantic similarity model is trained. The second training sample set includes a group of samples selected from the parallel corpus, and the negative sample of each sample in the group of samples is mined. That is, all the samples selected from the parallel corpus are positive samples, and the mined samples are negative samples. When the semantic similarity model is trained with the second training sample set, the score of the positive sample by the semantic similarity model is higher than that of the negative sample, thus further improving the identifying accuracy of the semantic similarity model.

It should be noted that, in this embodiment, in the training process, the above-mentioned steps S101-S104 may be repeated to iteratively train the machine translation model and the semantic similarity model until both models are converged.

In the method for training models in machine translation according to this embodiment, the similar target sentences of the group of samples are mined based on the parallel corpus using the machine translation model and the semantic similarity model, and the first training sample set is created; the machine translation model is trained with the first training sample set; the negative sample of each sample in the group of samples is mined based on the parallel corpus using the machine translation model and the semantic similarity model, and the second training sample set is created; and the semantic similarity model is trained with the second sample training set; by training the two models jointly, while the semantic similarity model is trained, the machine translation model may be optimized and nurtures the semantic similarity model, thus further improving the accuracy of the semantic similarity model.

Moreover, in this embodiment, when the semantic similarity model is trained, a prediction result of the machine translation model serves as input data, unlike the prior art that translation results which are annotated manually are adopted in many training processes, which causes inconsistent distribution of samples in the training and prediction processes and the problem that the model is unable to recognize the machine translation results during prediction. The technical solution of this embodiment may ensure that the samples encountered by the semantic similarity model in the training process and the later prediction process are the translation results of the machine translation model, thus further improving the accuracy and the stability of the semantic similarity model.

Figure 2:
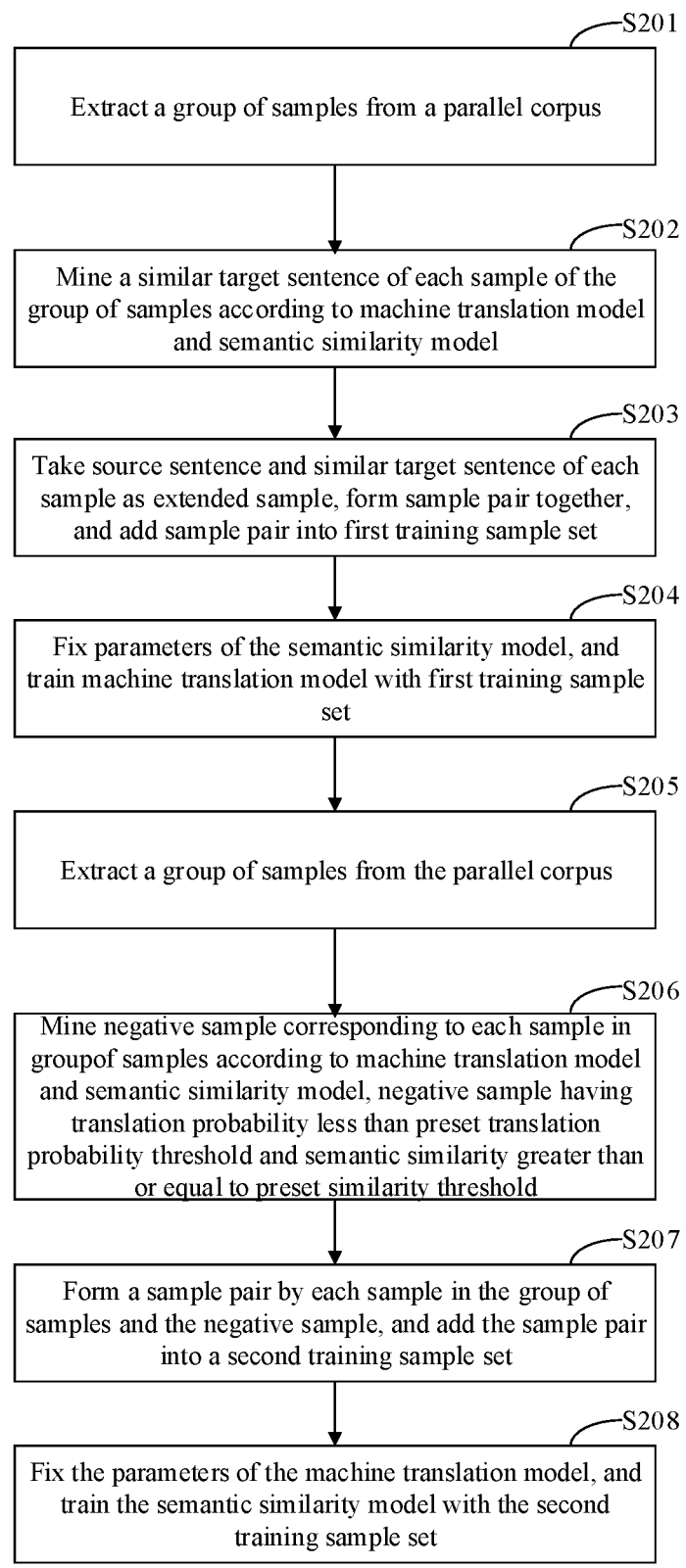
FIG. 2 is a schematic diagram according to a second embodiment of the present application.

FIG. 2 is a schematic diagram according to a second embodiment of the present application; as shown in FIG. 2, the technical solution of the method for training models in machine translation according to this embodiment of the present application is further described in more detail based on the technical solution of the above-mentioned embodiment shown in FIG. 1. As shown in FIG. 2, the method for training models in machine translation according to this embodiment may include the following steps:

S201: extracting a group of samples from a parallel corpus.

S202: mining a similar target sentence of each sample of the group of samples according to a machine translation model and a semantic similarity model.

In this embodiment, it may be assumed that a source sentence in any sample of the parallel corpus may have two target sentences with the same meaning. Then, the group of samples may be extracted from the parallel corpus randomly. The number of the samples in the group may be one, two or more, and the specific number may be set according to the number requirement of the samples required in each training step.

Another similar target sentence other than the corresponding target sentence of the translated source sentence in each sample in the extracted group of samples is mined. For example, the similar target sentence of each sample may be specifically mined by:

(1) acquiring the target sentence and a plurality of candidate target sentences in each sample of the group of samples according to the machine translation model, wherein the target sentence and the candidate target sentences are obtained after the machine translation model translates the source sentence in the sample.

It should be noted that the source sentence in each sample is input into the machine translation model, and the machine translation model may output all translated sentences of the source sentence, including the target sentence and the plural candidate target sentences in the sample, and also output the translation probability of each target sentence. Since the machine translation model is pre-trained with the parallel corpus, the target sentence has the highest translation probability, and other candidate target sentences have the translation probabilities which are relatively low.

(2) calculating the semantic similarities of the source sentence and each candidate target sentence using the semantic similarity model respectively.

The semantic similarity model in this embodiment is also pre-trained, and the source sentence and each candidate target sentence in this sample are used as an extended sample and input into the semantic similarity model, and the semantic similarity model may also output the semantic similarity of the extended sample.

(3) acquiring the candidate target sentence with the maximum semantic similarity from the plural candidate target sentences as the similar target sentence of the sample.

In this embodiment, the candidate target sentence with the maximum semantic similarity may be selected from the plural candidate target sentences as the similar target sentence of the sample, i.e., the other similar target sentence other than the target sentence and corresponding to the source sentence in the sample.

S203: taking the source sentence and the similar target sentence of each sample of the group of samples as the extended sample, forming a sample pair together with the sample, and adding the sample pair into a first training sample set.

With the method according to this embodiment, the sample (x, y) in the parallel corpus may be extended into the extended sample (x, y'), and y' and y have the similar meaning and may be used as translations of x. Then, (x, y) and (x, y') serve as the sample pair to be added into the first training sample set. Similarly, one sample pair may be added into the first training sample set.

The steps S201-S203 constitute an implementation of the step S101 in the above-mentioned embodiment shown in FIG. 1.

In addition, optionally, in this embodiment, when the first training sample set is mined, the similar target sentence and the semantic similarity thereof may also be acquired for each sample of the parallel corpus with the method in the above-mentioned embodiment. Then, the group of samples with the maximum semantic similarity and the similar target sentences corresponding to the samples are acquired based on the semantic similarities of the similar target sentences of the samples to form the sample pair, and the sample pair is added into the first training data set.

S204: fixing parameters of the semantic similarity model, and training the machine translation model with the first training sample set.

In the training step, the parameters of the semantic similarity model are fixed, and only the first training sample set is adopted to train parameters of the machine translation model. The sample pair selected from the first training sample set includes the samples which are selected according to the semantic similarity and have the highest semantic similarity, and the machine translation model is trained with the first training sample set, with the purpose of increasing the diversity of the translation results of the machine translation model and the translation confidence of the corresponding similar target sentence.

Since the semantic similarity model and the machine translation model in this embodiment are trained independently, the training process in this embodiment may be regarded as fine tuning the parameters of the machine translation model based on the existing trained models, so as to improve the diversity of the translation results of the machine translation model and the translation confidence of the similar target sentence.

S205: extracting a group of samples from the parallel corpus.

Optionally, the samples may be extracted in the same way as in the step S201, and extracted randomly.

S206: mining a negative sample corresponding to each sample in the group of samples according to the machine translation model and the semantic similarity model, the negative sample having a translation probability less than a preset translation probability threshold and a semantic similarity greater than or equal to a preset similarity threshold.

The mining step is used to acquire the negative sample which has a translation probability lower than the preset probability threshold, but has a good semantic similarity greater than or equal to the preset similarity threshold. Thus, selection of the negative sample with a high semantic similarity may be avoided, and the inconsistent distribution of the training samples and the prediction samples may be avoided.

For example, the negative sample corresponding to each sample may be mined by:

(A) acquiring the target sentence and the plural candidate target sentences in each sample of the group of samples as well as the translation probability of each candidate target sentence according to the machine translation model, wherein the target sentence, the candidate target sentences and the translation probabilities are obtained after the machine translation model translates the source sentence in the sample.

(B) screening a plurality of alternative target sentences having the translation probabilities less than the preset translation probability threshold from the plural candidate target sentences according to the translation probability of each candidate target sentence.

That is, in this embodiment, the negative example is preferably generated from the candidate target sentence with a low translation probability, so as to avoid selecting the negative example with a high semantic similarity.

(C) calculating the semantic similarities of the source sentence and each alternative target sentence using the semantic similarity model respectively.

(D) acquiring the alternative target sentence having a semantic similarity greater than or equal to the preset similarity threshold from the plural alternative target sentences to serve as the target sentence of the negative sample, and forming the negative sample together with the source sentence of the sample.

For example, the alternative target sentence with a semantic similarity greater than and closest to the semantic similarity threshold may be preferably selected as the target sentence of the negative sample, so as to avoid selecting the negative sample with a high semantic similarity.

S207: forming a sample pair by each sample in the group of samples and the negative sample, and adding the sample pair into the second training sample set.

The steps S205-S207 are an implementation of the step S103 in the above-mentioned embodiment shown in FIG. 1.

In addition, optionally, in the selection process of the second training sample set, the above-mentioned processing process may also be performed on each sample in the parallel corpus to obtain the negative sample corresponding to each sample and the semantic similarity corresponding to the negative sample. Then, a group of samples corresponding to the negative samples with the semantic similarities closest to the preset similarity threshold are selected to form the second training sample set. The second training sample set created in this way may also effectively avoid selecting the negative sample with a high semantic similarity.

S208: fixing the parameters of the machine translation model, and training the semantic similarity model with the second training sample set.

With the training step, the semantic similarity model may learn to score the positive sample in each sample pair of the second training set higher than the negative sample. It is ensured that the negative sample is prevented from being the sample with a high semantic similarity of the positive sample in the second training sample set, thus avoiding influences on the training process of the semantic similarity model caused by selection of the negative sample with a high semantic similarity. In this way, the semantic similarity model is not trained with a pair of positive sample and negative sample with the same meaning, thus improving the performance of the semantic similarity model to identify the samples with the same meaning. In this training step, the negative samples in the second training sample set are all real translation results of the machine translation model instead of translation results which are manually annotated, the validity and the authenticity of the training data of the semantic similarity model may be effectively guaranteed, and then, the accuracy and the stability of the semantic similarity model may be further guaranteed when the samples are used. The problem that the samples are unable to be identified due to the inconsistent distribution of the prediction samples and the training samples is solved.

Figure 3:
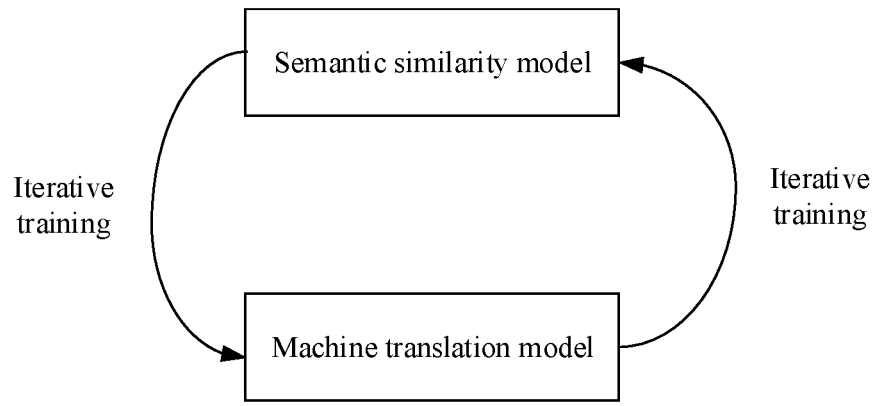
FIG. 3 is a schematic diagram of an iterative training method according to the present application.

It should be noted that, in this embodiment, the steps S201-S208 may be repeated to iteratively train and optimize the machine translation model and the semantic similarity model with the iterative training method in the embodiment shown in FIG. 3 until both models are converged. However, in the training process in this embodiment, although the machine translation model is used and trained, since the accuracy of the machine translation model is unable to be guaranteed while the diversity of the translation of the machine translation model is enriched, optimization of the machine translation model is only an additional effect. The accuracy of the machine translation model is also required to be verified by the semantic similarity model, and therefore, the final target is to improve the performance of the semantic similarity model, and the machine translation model is only used to assist in training the semantic similarity model. Therefore, the semantic similarity model which is trained jointly in this embodiment may identify the similar target sentence, ensure that the similar target sentence has a corresponding high score, and have an improved performance.

With the above-mentioned technical solution of the method for training models in machine translation according to this embodiment, by training the two models jointly, while the semantic similarity model is trained, the machine translation model may be optimized and nurtures the semantic similarity model, thus further improving the accuracy of the semantic similarity model. Moreover, the technical solution of this embodiment may ensure that the samples encountered by the semantic similarity model in the training process and the later prediction process are the translation results of the machine translation model, thus further improving the accuracy and the stability of the semantic similarity model.

Figure 4:
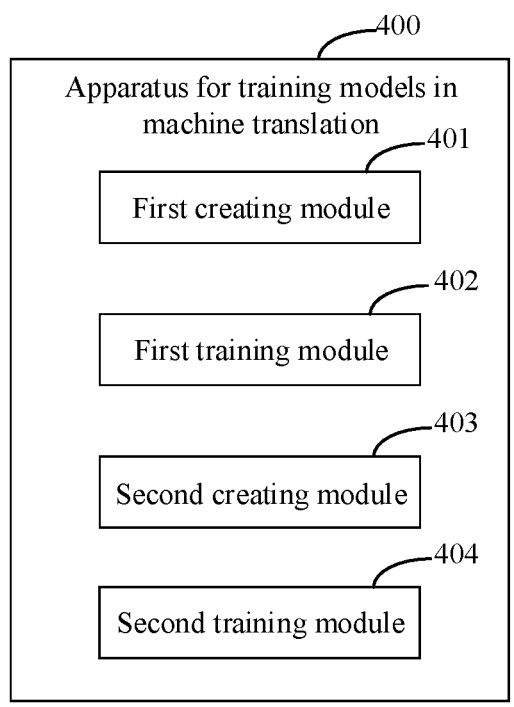
FIG. 4 is a schematic diagram according to a third embodiment of the present application.

FIG. 4 is a schematic diagram according to a third embodiment of the present application; as shown in FIG. 4, this embodiment provides an apparatus 400 for training models in machine translation, including:

a first creating module 401 configured to mine similar target sentences of a group of samples based on a parallel corpus using a machine translation model and a semantic similarity model, and create a first training sample set;

a first training module 402 configured to train the machine translation model with the first training sample set;

a second creating module 403 configured to mine a negative sample of each sample in the group of samples based on the parallel corpus using the machine translation model and the semantic similarity model, and create a second training sample set; and a second training module 404 configured to train the semantic similarity model with the second sample training set.

The apparatus 400 for training models in machine translation according to this embodiment has the same implementation as the above-mentioned relevant method embodiment by adopting the above-mentioned modules to implement the implementation principle and the technical effects of training the models in machine translation, detailed reference may be made to the above-mentioned description of the relevant method embodiment, and details are not repeated herein.

Figure 5:
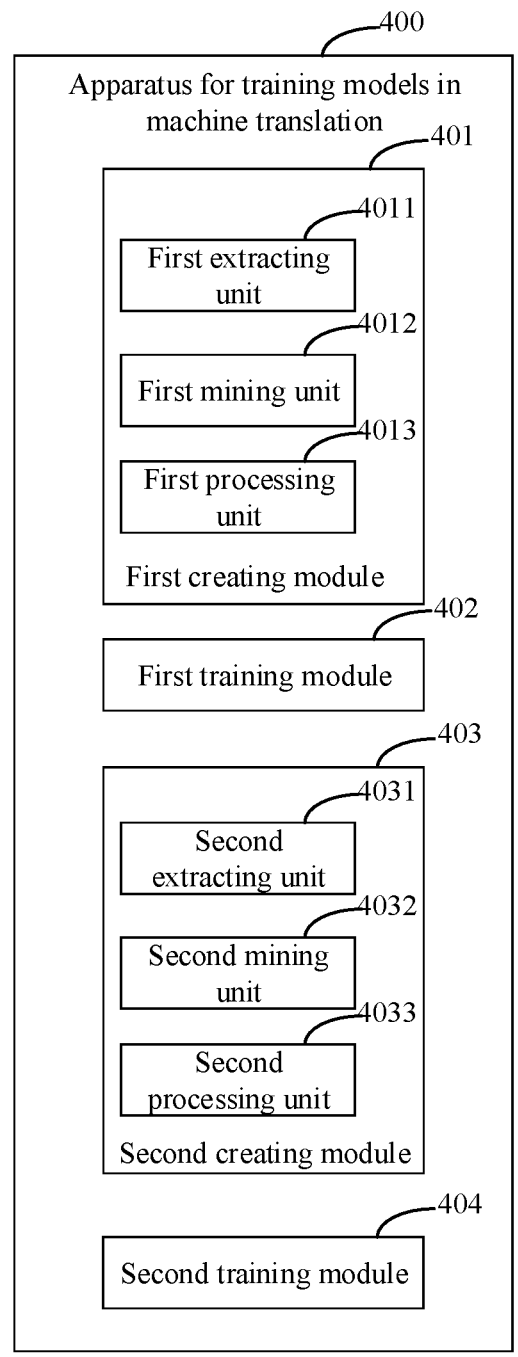
FIG. 5 is a schematic diagram according to a fourth embodiment of the present application.

FIG. 5 is a schematic diagram according to a fourth embodiment of the present application; as shown in FIG. 5, the technical solution of the apparatus 400 for training models in machine translation according to this embodiment of the present application is further described in more detail based on the technical solution of the above-mentioned embodiment shown in FIG. 4.

As shown in FIG. 5, in the apparatus 400 for training models in machine translation according to this embodiment, the first creating module 401 includes:

a first extracting unit 4011 configured to extract a group of samples from the parallel corpus;

a first mining unit 4012 configured to mine a similar target sentence of each sample of the group of samples according to a machine translation model and a semantic similarity model; and a first processing unit 4013 configured to take the source sentence and the similar target sentence of each sample of the group of samples as the extended sample, form a sample pair together with the sample, and add the sample pair into a first training sample set.

Further optionally, the first mining unit 4012 is configured to:

acquire the target sentence and a plurality of candidate target sentences in each sample of the group of samples according to the machine translation model, wherein the target sentence and the candidate target sentences are obtained after the machine translation model translates the source sentence in the sample;

calculate the semantic similarities of the source sentence and each candidate target sentence using the semantic similarity model respectively; and acquire the candidate target sentence with the maximum semantic similarity from the plural candidate target sentences as the similar target sentence of the sample.

Further optionally, as shown in FIG. 5, in the apparatus 400 for training models in machine translation according to this embodiment, the second creating module 403 includes:

a second extracting unit 4031 configured to extract a group of samples from the parallel corpus;

a second mining unit 4032 configured to mine a negative sample corresponding to each sample in the group of samples according to the machine translation model and the semantic similarity model, the negative sample having a translation probability less than a preset translation probability threshold and a semantic similarity greater than or equal to a preset similarity threshold; and a second processing unit 4033 configured to form a sample pair by each sample in the group of samples and the negative sample, and add the sample pair into the second training sample set.

Further, the second mining unit 4032 is configured to:

acquire the target sentence and the plural candidate target sentences in each sample of the group of samples as well as the translation probability of each candidate target sentence according to the machine translation model, wherein the target sentence, the candidate target sentences and the translation probabilities are obtained after the machine translation model translates the source sentence in the sample;

screen a plurality of alternative target sentences having the translation probabilities less than the preset translation probability threshold from the plural candidate target sentences according to the translation probability of each candidate target sentence;

calculate the semantic similarities of the source sentence and each alternative target sentence using the semantic similarity model respectively; and acquire the alternative target sentence having a semantic similarity greater than or equal to the preset similarity threshold from the plural alternative target sentences to serve as the target sentence of the negative sample, and form the negative sample together with the source sentence of the sample.

The apparatus 400 for training models in machine translation according to this embodiment has the same implementation as the above-mentioned relevant method embodiment by adopting the above-mentioned modules to implement the implementation principle and the technical effects of training the models in machine translation, detailed reference may be made to the above-mentioned description of the relevant method embodiment, and details are not repeated herein.

According to the embodiments of the present application, there are also provided an electronic device and a readable storage medium.

Figure 6:
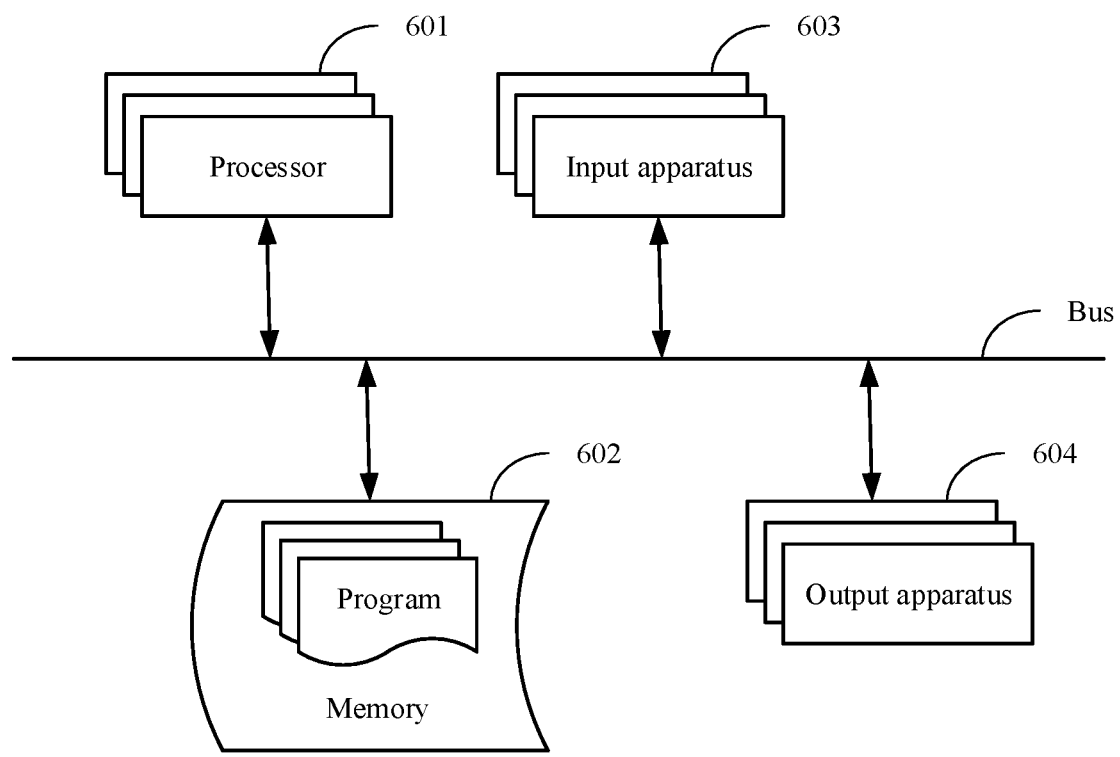
FIG. 6 is a block diagram of an electronic device configured to implement a method for training models in machine translation according to the embodiments of the present application.

FIG. 6 is a block diagram of an electronic device configured to implement the method for training a model in machine translation according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 6, the electronic device includes one or more processors 601, a memory 602, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 6, one processor 601 is taken as an example.

The memory 602 is configured as the non-transitory computer readable storage medium according to the present application. The memory stores instructions executable by the at least one processor to cause the at least one processor to perform a method for training a model in machine translation according to the present application. The non-transitory computer readable storage medium according to the present application stores computer instructions for causing a computer to perform the method for training a model in machine translation according to the present application.

The memory 602 which is a non-transitory computer readable storage medium may be configured to store non-transitory software programs, non-transitory computer executable programs and modules, such as program instructions/modules corresponding to the method for training a model in machine translation according to the embodiments of the present application (for example, the relevant modules shown in FIGS. 4 and 5). The processor 601 executes various functional applications and data processing of a server, that is, implements the method for training a model in machine translation according to the above-mentioned embodiments, by running the non-transitory software programs, instructions, and modules stored in the memory 602.

The memory 602 may include a program storage area and a data storage area, wherein the program storage area may store an operating system and an application program required for at least one function; the data storage area may store data created according to use of the electronic device for implementing the method for training a model in machine translation, or the like. Furthermore, the memory 602 may include a high-speed random access memory, or a non-transitory memory, such as at least one magnetic disk storage device, a flash memory device, or other non-transitory solid state storage devices. In some embodiments, optionally, the memory 602 may include memories remote from the processor 601, and such remote memories may be connected via a network to the electronic device for implementing the method for training a model in machine translation. Examples of such a network include, but are not limited to, the Internet, intranets, local area networks, mobile communication networks, and combinations thereof.

The electronic device for implementing the method for training a model in machine translation may further include an input apparatus 603 and an output apparatus 604. The processor 601, the memory 602, the input apparatus 603 and the output apparatus 604 may be connected by a bus or other means, and FIG. 6 takes the connection by a bus as an example.

The input apparatus 603 may receive input numeric or character information and generate key signal input related to user settings and function control of the electronic device for implementing the method for training a model in machine translation, such as a touch screen, a keypad, a mouse, a track pad, a touch pad, a pointing stick, one or more mouse buttons, a trackball, a joystick, or the like. The output apparatus 604 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN), the Internet and a blockchain network.

A computer system may include a client and a server. Generally, the client and the server are remote from each other and interact through the communication network. The relationship between the client and the server is generated by virtue of computer programs which are run on respective computers and have a client-server relationship to each other.

With the technical solution of the embodiments of the present application, the similar target sentences of the group of samples are mined based on the parallel corpus using the machine translation model and the semantic similarity model, and the first training sample set is created; the machine translation model is trained with the first training sample set; the negative sample of each sample in the group of samples is mined based on the parallel corpus using the machine translation model and the semantic similarity model, and the second training sample set is created; and the semantic similarity model is trained with the second sample training set; by training the two models jointly, while the semantic similarity model is trained, the machine translation model may be optimized and nurtures the semantic similarity model, thus further improving the accuracy of the semantic similarity model.

With the technical solution of the embodiments of the present application, when the semantic similarity model is trained, the prediction result of the machine translation model serves as the input data, unlike the prior art that the translation results which are annotated manually are adopted in many training processes, which causes inconsistent distribution of samples in the training and prediction processes and the problem that the model is unable to recognize the machine translation results during prediction. The technical solution of this embodiment may ensure that the samples encountered by the semantic similarity model in the training process and the later prediction process are the translation results of the machine translation model, thus further improving the accuracy and the stability of the semantic similarity model.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for training models in machine translation, comprising:
    mining similar target sentences of a group of samples based on a parallel corpus using a machine translation model and a semantic similarity model, and creating a first training sample set;
    training the machine translation model with the first training sample set;
    mining a negative sample of each sample in the group of samples based on the parallel corpus using the machine translation model and the semantic similarity model, and creating a second training sample set; and
    training the semantic similarity model with the second training sample set,
    wherein the mining a negative sample of each sample in the group of samples based on the parallel corpus using the machine translation model and the semantic similarity model, and creating a second training sample set, comprises:
    extracting a group of samples from the parallel corpus;
    mining a negative sample corresponding to each sample in the group of samples according to the machine translation model and the semantic similarity model, the negative sample having a translation probability less than a preset translation probability threshold and a semantic similarity greater than or equal to a preset similarity threshold; and
    forming a sample pair by each sample in the group of samples and the negative sample, and adding the sample pair into the second training sample set,
    wherein the mining a negative sample corresponding to each sample in the group of samples according to the machine translation model and the semantic similarity model, the negative sample having a translation probability less than a preset translation probability threshold and a semantic similarity greater than or equal to a preset similarity threshold, comprises:
    acquiring a target sentence and a plurality of candidate target sentences in each sample of the group of samples as well as the translation probability of each candidate target sentence according to the machine translation model, wherein the target sentence, the candidate target sentences and the translation probabilities are obtained after the machine translation model translates a source sentence in the sample;
    screening a plurality of alternative target sentences having the translation probabilities less than the preset translation probability threshold from the plurality of candidate target sentences according to the translation probability of each candidate target sentence;
    calculating the semantic similarities of the source sentence and each alternative target sentence using the semantic similarity model respectively; and
    acquiring the alternative target sentence having the semantic similarity greater than or equal to the preset similarity threshold from the plurality of alternative target sentences to serve as the target sentence of the negative sample, and forming the negative sample together with the source sentence of the sample.

2. The method according to claim 1, wherein the mining similar target sentences of a group of samples based on a parallel corpus using a machine translation model and a semantic similarity model, and creating a first training sample set comprises:

extracting a group of samples from the parallel corpus;
mining a similar target sentence of each sample of the group of samples according to the machine translation model and the semantic similarity model; and
taking the source sentence and a similar target sentence of each sample of the group of samples as an extended sample, forming a sample pair together with the sample, and adding the sample pair into the first training sample set.

3. The method according to claim 2, wherein the mining a similar target sentence of each sample of the group of samples according to the machine translation model and the semantic similarity model comprises:
acquiring the target sentence and the plurality of candidate target sentences in each sample of the group of samples according to the machine translation model, wherein the target sentence and the candidate target sentences are obtained after the machine translation model translates the source sentence in the sample;
calculating the semantic similarities of the source sentence and each candidate target sentence using the semantic similarity model respectively; and
acquiring the candidate target sentence with the maximum semantic similarity from the plurality of candidate target sentences as the similar target sentence of the sample.

4. An electronic device, comprising:
at least one processor; and
a memory communicatively connected with the at least one processor;
wherein the memory stores instructions executable by the at least one processor, and the instructions are executed by the at least one processor to enable the at least one processor to perform a method for training models in machine translation, wherein the method comprises:
mining similar target sentences of a group of samples based on a parallel corpus using a machine translation model and a semantic similarity model, and creating a first training sample set;
training the machine translation model with the first training sample set;
mining a negative sample of each sample in the group of samples based on the parallel corpus using the machine translation model and the semantic similarity model, and creating a second training sample set; and
training the semantic similarity model with the second training sample set,
wherein the mining a negative sample of each sample in the group of samples based on the parallel corpus using the machine translation model and the semantic similarity model, and creating a second training sample set, comprises:
extracting a group of samples from the parallel corpus;
mining a negative sample corresponding to each sample in the group of samples according to the machine translation model and the semantic similarity model, the negative sample having a translation probability less than a preset translation probability threshold and a semantic similarity greater than or equal to a preset similarity threshold; and
forming a sample pair by each sample in the group of samples and the negative sample, and adding the sample pair into the second training sample set,
wherein the mining a negative sample corresponding to each sample in the group of samples according to the machine translation model and the semantic similarity model, the negative sample having a translation probability less than a preset translation probability threshold and a semantic similarity greater than or equal to a preset similarity threshold, comprises:
acquiring a target sentence and a plurality of candidate target sentences in each sample of the group of samples as well as the translation probability of each candidate target sentence according to the machine translation model, wherein the target sentence, the candidate target sentences and the translation probabilities are obtained after the machine translation model translates a source sentence in the sample;
screening a plurality of alternative target sentences having the translation probabilities less than the preset translation probability threshold from the plurality of candidate target sentences according to the translation probability of each candidate target sentence;
calculating the semantic similarities of the source sentence and each alternative target sentence using the semantic similarity model respectively; and
acquiring the alternative target sentence having the semantic similarity greater than or equal to the preset similarity threshold from the plurality of alternative target sentences to serve as the target sentence of the negative sample, and forming the negative sample together with the source sentence of the sample.

5. The electronic device according to claim 4, wherein the mining similar target sentences of a group of samples based on a parallel corpus using a machine translation model and a semantic similarity model, and creating a first training sample set comprises:
extracting a group of samples from the parallel corpus;
mining a similar target sentence of each sample of the group of samples according to the machine translation model and the semantic similarity model; and
take the source sentence and a similar target sentence of each sample of the group of samples as an extended sample, forming a sample pair together with the sample, and adding the sample pair into the first training sample set.

6. The electronic device according to claim 5, wherein the mining a similar target sentence of each sample of the group of samples according to the machine translation model and the semantic similarity model comprises:
acquiring the target sentence and the plurality of candidate target sentences in each sample of the group of samples according to the machine translation model, wherein the target sentence and the candidate target sentences are obtained after the machine translation model translates the source sentence in the sample;
calculating the semantic similarities of the source sentence and each candidate target sentence using the semantic similarity model respectively; and
acquiring the candidate target sentence with the maximum semantic similarity from the plurality of candidate target sentences as the similar target sentence of the sample.

7. A non-transitory computer readable storage medium with computer instructions stored thereon, wherein the computer instructions are used for causing a computer to perform a method for training models in machine translation, wherein the method comprises:
mining similar target sentences of a group of samples based on a parallel corpus using a machine translation model and a semantic similarity model, and creating a first training sample set;
training the machine translation model with the first training sample set;

mining a negative sample of each sample in the group of samples based on the parallel corpus using the machine translation model and the semantic similarity model, and creating a second training sample set; and training the semantic similarity model with the second training sample set, wherein the mining a negative sample of each sample in the group of samples based on the parallel corpus using the machine translation model and the semantic similarity model, and creating a second training sample set, comprises:

extracting a group of samples from the parallel corpus;

mining a negative sample corresponding to each sample in the group of samples according to the machine translation model and the semantic similarity model, the negative sample having a translation probability less than a preset translation probability threshold and a semantic similarity greater than or equal to a preset similarity threshold; and forming a sample pair by each sample in the group of samples and the negative sample, and adding the sample pair into the second training sample set, wherein the mining a negative sample corresponding to each sample in the group of samples according to the machine translation model and the semantic similarity model, the negative sample having a translation probability less than a preset translation probability threshold and a semantic similarity greater than or equal to a preset similarity threshold, comprises:

acquiring a target sentence and a plurality of candidate target sentences in each sample of the group of samples as well as the translation probability of each candidate target sentence according to the machine translation model, wherein the target sentence, the candidate target sentences and the translation probabilities are obtained after the machine translation model translates a source sentence in the sample;

screening a plurality of alternative target sentences having the translation probabilities less than the preset translation probability threshold from the plurality of candidate target sentences according to the translation probability of each candidate target sentence;

calculating the semantic similarities of the source sentence and each alternative target sentence using the semantic similarity model respectively; and acquiring the alternative target sentence having the semantic similarity greater than or equal to the preset similarity threshold from the plurality of alternative target sentences to serve as the target sentence of the negative sample, and forming the negative sample together with the source sentence of the sample.

8. The non-transitory computer readable storage medium according to claim 7, wherein the mining similar target sentences of a group of samples based on a parallel corpus using a machine translation model and a semantic similarity model, and creating a first training sample set comprises:

extracting a group of samples from the parallel corpus;

mining a similar target sentence of each sample of the group of samples according to the machine translation model and the semantic similarity model; and taking the source sentence and a similar target sentence of each sample of the group of samples as an extended sample, forming a sample pair together with the sample, and adding the sample pair into the first training sample set.

9. The non-transitory computer readable storage medium according to claim 8, wherein the mining a similar target sentence of each sample of the group of samples according to the machine translation model and the semantic similarity model comprises:

acquiring the target sentence and the plurality of candidate target sentences in each sample of the group of samples according to the machine translation model, wherein the target sentence and the candidate target sentences are obtained after the machine translation model translates the source sentence in the sample;

calculating the semantic similarities of the source sentence and each candidate target sentence using the semantic similarity model respectively; and acquiring the candidate target sentence with the maximum semantic similarity from the plurality of candidate target sentences as the similar target sentence of the sample.

\* \* \* \* \*